United States Patent
Farooq et al.

(10) Patent No.: US 7,638,582 B2
(45) Date of Patent: Dec. 29, 2009

(54) ACRYLIC COMPOSITIONS

(75) Inventors: Fareeduddin Farooq, Memphis, TN (US); Andrew H. Janowicz, Cordova, TN (US); James R. Leach, Drummonds, TN (US); Philip A. Janowicz, Cordova, TN (US)

(73) Assignee: Lucite International, Inc., Cordova, TN (US)

( * ) Notice: Subject to any disclaimer, the term of this patent is extended or adjusted under 35 U.S.C. 154(b) by 16 days.

(21) Appl. No.: 10/532,867

(22) PCT Filed: Oct. 29, 2003

(86) PCT No.: PCT/US03/34401

§ 371 (c)(1),
(2), (4) Date: Oct. 14, 2005

(87) PCT Pub. No.: WO2004/039884

PCT Pub. Date: May 13, 2004

(65) Prior Publication Data

US 2006/0128874 A1    Jun. 15, 2006

Related U.S. Application Data

(60) Provisional application No. 60/421,770, filed on Oct. 29, 2002.

(51) Int. Cl.
*C08L 33/12* (2006.01)

(52) U.S. Cl. .................... 525/228; 525/224; 525/225; 525/226; 525/305

(58) Field of Classification Search ................. 525/228, 525/224, 225, 226, 305
See application file for complete search history.

(56) References Cited

U.S. PATENT DOCUMENTS

| | | | |
|---|---|---|---|
| 4,048,257 | A | 9/1977 | Stevenson |
| 4,085,246 | A | 4/1978 | Buser et al. |
| 4,159,301 | A | 6/1979 | Buser et al. |
| 4,959,401 | A | 9/1990 | Bellasalma et al. |
| 5,043,077 | A | 8/1991 | Chandler et al. |
| 5,243,968 | A | 9/1993 | Byun |
| 5,304,592 | A | 4/1994 | Ghahary |
| 5,415,931 | A | 5/1995 | Minghetti et al. |
| 5,882,560 | A | 3/1999 | Ittmann et al. |

FOREIGN PATENT DOCUMENTS

| | | | |
|---|---|---|---|
| JP | 09-164538 | * | 6/1997 |
| JP | 09164538 | | 6/1997 |
| JP | 2002018865 | | 1/2002 |
| WO | 97/14749 | | 4/1997 |
| WO | WO 97/14749 | * | 4/1997 |
| WO | WO 98/52999 | | 11/1998 |
| WO | WO 00/24825 | | 5/2000 |
| WO | WO 0024825 A1 | * | 5/2000 |

* cited by examiner

*Primary Examiner*—Robert D. Harlan
(74) *Attorney, Agent, or Firm*—Jones Day

(57) ABSTRACT

The present invention relates to a thermoformable sheet, for example, an acrylic sheet, comprising particles proximate to the top surface, wherein the textured sheet, when thermoformed, provides a low-gloss, textured surface that is less sensitive to marring, blemishes (including blemishes resulting from the mold), household wear and tear, and visibly reduces the appearance of oil deposits on its surface.

23 Claims, No Drawings

ACRYLIC COMPOSITIONS

CROSS REFERENCE TO RELATED APPLICATIONS

This application is the National Phase application of International Application No. PCT/US2003/034401, filed Oct. 29, 2003, which designated the United States and was published in English and which further claims the benefit of U.S. Provisional Patent Application No. 60/421,770, filed Oct. 29, 2002. The related applications, in their entirety, are incorporated herein by reference.

FIELD OF THE INVENTION

The present invention is directed to an acrylic composition which can be processed into sheet material having a textured appearance and a process for making the same. More specifically, the present invention is directed to an acrylic composition comprising a matrix of polymethyl (meth)acrylate comprising surface-seeking particles.

BACKGROUND OF THE INVENTION

Polymer products, particularly acrylic products, having a textured appearance and methods for their production are known in the art. Such products have found particular application in the spa and bathware industries, and are also useful in forming point of purchase displays, signs, wall coverings, counter tops, and the like.

In general, known methods for the production of acrylic compositions to form acrylic sheet products having a textured appearance comprise the addition of various inorganic or organic particles or fillers to an acrylic solution or syrup. For example, U.S. Pat. Nos. 4,159,301 and 4,085,246 disclose a simulated granite material comprising a matrix of acrylic polymer and various opaque and translucent particles having specific optical densities. U.S. Pat. No. 5,304,592 discloses a simulated mineral article comprising a plastic material suspended within a thermoplastic matrix. The plastic material comprises both a thermoplastic and thermoset plastic, and the matrix consists essentially of a themoplastic material. U.S. Pat. No. 5,043,077 discloses a granite-like artificial stone comprising a matrix of radical-polymerizable monomers (containing methacrylate and an aromatic vinyl compound) and an inorganic filler, where the filler comprises radical-polymerizable monomers which may be the same or different than those used in the matrix. U.S. Pat. No. 4,959,401 discloses a composition suitable for making synthetic rock comprising an organic portion comprising one or more polymers and an inorganic filler portion comprising an oxide pigment, kaolin and a binder. However, each of these compositions has demonstrated difficulties in processing and, later, thermoforming.

The use of a polymeric material as the particulate or filler component of such compositions has been found to be preferred over the various fillers previously used. Such particles provide sufficient opacity to the composition for hiding and decorative purposes. However, care must be taken in formulating such compositions since the polymeric particles will swell due to the absorption of the matrix monomer to a volume that may be several times greater than their initial volume. The swelling of the particles will increase the viscosity of the composition and prevent the particles from settling.

Such compositions have been used in practice only with difficulty, as the size and swelling of the particles have not heretofore been optimized. In order to produce a material which is easily prepared, aesthetically pleasing and particularly suitable for further processing, the size and swelling rate of the particles must be controlled and optimized. In conventional methods for preparing textured acrylic materials, such as that disclosed in U.S. Pat. Nos. 5,243,968 and 5,415,931, the particles are often made from cell cast, continuous cast or extruded sheet material. These particles are often difficult to use as they either swell to an extent or at a rate which does not provide optimum results.

If the particles swell too much, the composition may absorb nearly all of the liquid or matrix phase, making its viscosity so great as to be unworkable. Alternatively, the particles may dissolve, losing their character altogether. U.S. Pat. No. 5,880,207 describes an acrylic composition in which swollen polymer particles are dispersed within a polymethyl (meth)acrylate matrix.

SUMMARY OF THE INVENTION

The present invention relates to a thermoformable sheet comprising particles proximate to the top surface, wherein the textured sheet, when thermoformed, provides a low-gloss, textured surface that is less sensitive to marring, blemishes (including blemishes resulting from the mold), household wear and tear, and visibly reduces the appearance of oil deposits on its surface (e.g., fingerprints).

The textured material differs from previous granite like materials (e.g., Lucite Natural Granite Series) in that it provides a pleasing surface texture with fewer and smaller particles. In addition, unlike the granite materials which previously required particles which were extensively swollen prior to cure (e.g., 6-8 times their original size), the present invention utilizes unswollen particles that are added to a curable material and immediately cured. As this process requires minimal contact time between the curable matrix material and the particles, there is no requirement to provide for a residence time for the particle in the curable material. Since minimal residency time is desired, this process is very flexible because the feedstock curable material need not contain the particles, and thus the different particles may be easily interchanged, mixed or included, allowing products of different color, texture, or specifications to be produced with less downtime, waste and expense. This property allows for a versatile production facility which is better suited to meet the burden of an ever growing consumer demand for greater variety, selection and availability of colors and styles of thermoformable sheet with lower production costs.

Without wishing to be bound to any particular theory, it is believed that the particles of the present invention impart texture to the thermoformed article by virtue of their higher stiffness (Young's modulus) relative to the polymeric matrix, which allows them to remain small and relatively unchanged during the thermoforming process. Furthermore, the increased stiffness of the particles, in combination with their tendency to position themselves proximate to a surface of the thermoformable sheet, allows them to protrude from the surface upon thermoforming. This, in turn, imparts desirable texture properties to the thermoformed article. Since the particles of the present invention produce a desirable texture during thermoforming, a commercially acceptable product is achieved with no additional texturing treatment or process need be applied to the acrylic article after thermoforming.

Accordingly, the present invention provides an acrylic composition suitable for processing into a product having a textured appearance comprising surface-seeking particles (i.e., particles having a surface affinity) and a polymer matrix. For example, selected particles that readily move in the uncured polymer matrix, for instance, by gravity or buoyancy, toward a surface of the matrix. In particular, surface-seeking particles having a density differential relative to the uncured polymer matrix that will tend to cause them to either sink or float to the bottom or top, respectively, of the uncured polymer matrix. The addition of such surface-seeking particles provides for a thermoformed article with a textured appearance while using less particulate material than conventional techniques, and simultaneously achieving greater process efficiency due to the elimination of pre-swelling of the particles, and the associated equipment necessary to accommodate such steps. In one embodiment, a thermoformable sheet is prepared by mixing particles with a curable composition, and curing said curable composition, prior to the particles substantially swelling, to form said thermoformable sheet The compositions of the present invention are well suited for use in a variety of products, for examples, bathtubs, shower stalls, sinks, whirlpools, spas or the like.

In addition, the lower particulate loading in compositions of the present invention exhibits superior physical properties as reflected in a higher Young's modulus, a higher ultimate stress, and a higher ultimate strains. These improved physical properties allow the compositions of the present invention to be thermoformed into deeper and more complex thermoforming molds.

DETAILED DESCRIPTION OF THE INVENTION

In one embodiment, the polymeric matrix to which the surface-seeking particle is added comprises an unsaturated monomer, such as polymethylmethacrylate (PMMA). The PMMA matrix utilized in the present composition is prepared prior to the addition of the surface-seeking particles. In one embodiment, the matrix is prepared by mixing a PMMA syrup which contains about 25% of PMMA solids with excess MMA monomer. In a further embodiment, PMMA syrup is prepared from standard MMA which is subjected to a conventional partial polymerization process, as exemplified in U.S. Pat. No. 4,152,501, the disclosure of which is incorporated herein by reference. The MMA monomer is added to the syrup in a ratio of about 1:1 to about 1:100, and preferably about 1:20 (syrup:monomer). The MMA monomer may contain small amounts, specifically less than about 5%, of other comonomers, such as butyl acrylate and ethylene glycol dimethacrylate. In addition, the MMA monomer may further comprise additives such as initiators, e.g., organic peroxides; chain transfer agents, e.g., dodecylmercaptan; and colorants, e.g., titanium dioxide and carbon black, or initiators such as t-amyl peroxy neodecanoate, t-butyl peroxyneoheptanoate, t-amyl peroxypivalate, t-butyl peroxypivalate, di-isononanoyl peroxide, di-decanoyl peroxide, t-amyl peroxy-2-ethylhexanoate, t-butyl peroxy-2-ethylhexanoate, 2,2'-Azobis(2,4-Dimethylvaleronitrile), 2,2'-Azobis(2-Methylbutyronitrile), 1,1'-Azobis(Cyanocyclohexane), and the like.

Typically, the uncured polymer matrix has a viscosity of at least 300 centipoise (cP), for example, at least 350 cP, at least 400 cP, or at least 500 cP. However, the viscosity of the uncured polymer matrix is typically less than 5000 cP, for example, less than 4500 cP, less than 4000 cP, or less than 3500 cP. The density of the uncured polymer matrix is usually less than 1.4 grams per milliliter (g/mL), for example, less than 1.2 g/mL, or less than 1.1 g/mL. However, the density of the polymer matrix of the present invention is usually greater than 0.75 g/mL, for example, greater than 0.9 g/mL.

The difference in density between the surface-seeking particle and the uncured polymer matrix and the viscosity of the uncured polymer matrix will often define which surface the surface-seeking particle will seek. As a general principle, the greater the difference in particle density to the uncured matrix density, and the lower the viscosity of the uncured polymer matrix, the more rapidly the particle will move toward a given surface. Typically, for the purposes of the present invention, suitable surface-seeking particles will be those possessing an average density difference relative to the uncured polymer matrix of at least 0.02 g/mL, for example, at least 0.03 g/mL, at least 0.05 g/mL, at least 0.09 g/mL, at least 0.1 g/mL, at least 0.2 g/mL or at least 0.3 g/mL. A further embodiment includes those wherein the polymer matrix includes a mixture of particles wherein at least one particle has a density lower than the polymer matrix, and at least one particle has a density greater than the polymer matrix.

The density of the surface-seeking particles will be determined by materials and formulations used to compose them. In one embodiment, the surface-seeking particle has a density which causes it to sink in the uncured polymer matrix and rest on or near the bottom surface of the container holding the matrix. For instance, depending on the particular polymer matrix selected, the density of the surface-seeking particle may have a density of greater than 1.0 g/mL, for example greater than 1.05 g/mL, greater than 1.1 g/mL or greater than 1.2 g/mL. In still another embodiment of the present invention, the surface-seeking particle may have a density less than that of the uncured polymer matrix, causing the particle to rise to an area on or near the surface of the uncured polymer matrix. For instance, depending on the particular polymer matrix selected, the density of the surface-seeking particle may have a density of less than 1.0 g/mL, for example less than 0.95 g/mL, less than 0.9 g/mL or greater than 0.8 g/mL.

The surface-seeking particles of the present invention can comprise any convenient particle material, for example, inorganic or a polymeric material.

In one embodiment, the surface-seeking particles of the present invention are particles comprised of inorganic materials. For example, the surface-seeking particles may comprise one or more metallic oxides, such as aluminum oxide, titanium oxide, zirconium oxide, antimony oxide, chromium oxide, germanium oxide, vanadium oxide, tungsten oxide, iron oxide, manganese oxide and cerium oxide are used. In another embodiment, one or more natural or synthetic clays such as kaolinite, halloysite, montmorillonite, vermiculite, saponite, dickite, nacrite, antiogorite, pyrophyllite, hectorite, beidellite, margarite, talc, tetrasilylic mica, muscovite, phlogopite and chlorite are used, preferably a smectite such as montmorillonite, saponite, hectorite and beidellite is used.

Among polymeric materials, the surface-seeking particle may comprise any convenient polymer which meets the density requirements set forth herein. For example, the surface-seeking particle may comprise polyethylene or polypropylene, an acrylonitrile/butadiene/styrene copolymer, or a poly (ethylene terephthalate) polymer. In another embodiment of the present invention, the surface-seeking particle comprises a polyalkyl (meth)acrylate or a copolymer of two or more polyalkyl (meth)acrylates.

In one embodiment of the present invention, the surface-seeking particle comprises a multifunctional (meth)acrylate monomers, for example, a (C2-C18)alkanediol di(meth)acrylate, and, in another embodiment, a (C4-C8)alkanediol (meth)acrylate. In another embodiment, the surface-seeking particle comprises a polymer selected from the group consisting of 1,2-ethanediol di(meth)acrylate; 1,3-propanediol di(meth)acrylate; 1,4-butanediol di(meth)acrylate; 1,5-pentanediol di(meth)acrylate; 1,6-hexanediol di(meth)acrylate; 1,8-octanediol di(meth)acrylate; and 1,10-decanediol di(meth)acrylate, and, more preferably, the surface-seeking polymer comprises 1,6-hexanediol diacrylate ("HDDA") or 1,4-butanediol diacrylate. In one embodiment of the invention, the particles are composed of cross-linked polymers, for example, a cross-linked polyacrylate, which may be derived from a continuous cast cross-linked polymer sheet. As used throughout this specification, it is understood that mixtures of the various (meth)acrylate monomers are within the scope of the invention.

In another embodiment, the surface-seeking particle comprises a polymer of an aromatic monomer. Suitable polymers of aromatic monomers include, but are not limited to: styrene; divinylbenzene; divinylnaphthalene; diallyl phthalate; and N,N-divinyl aniline. As used throughout this specification, it is understood that mixtures of the various aromatic monomers are within the scope of the invention.

When polymeric surface-seeking particles are used in the present invention, such particles may be cured after they are formed by polymerization. Such curing improves the compression resistance of the surface-seeking particles. Curing may be by any suitable means, such as chemical or heat curing. When the surface-seeking particles are heat cured, they may be cured in the reactor after polymerization, or may be cured in an oven. When heat cured, the surface-seeking particles may be heat cured at any temperature above 60° C., for example, above 80° C., above 100° C., or above 120° C. However, the curing step is usually preformed below the polymer's decomposition temperature, for example, below 320° C., below 250° C., below 200° C., or below 150° C. Typically, the polymer particle is held at the curing temperature for 0.01 to 6 hours, and preferably from 0.01 to 4 hours.

Surface-seeking particles of the present invention may be composed of polymethyl (meth)acrylate in an amount of greater than about 70 weight percent, for example, greater than 80, or greater than 90 weight percent, of polymethyl (meth)acrylate, and greater than about 1 weight percent, for example, greater than 10 weight percent, greater than 20 weight percent, or greater than 30 weight percent of a comononer comprising an ethylenically unsaturated monomer that is copolymerizable with methyl (meth)acrylate. These percentages, and all other percentages disclosed herein, are percent by weight of the total composition unless specifically noted. The comonomers is a lower alkyl acrylate or a lower alkyl (meth)acrylate, having a carbon number of about C1 to about C8, for example C2 to C8. Suitable comonomers include ethyl acrylate, butyl acrylate, propyl acrylate, isopropyl acrylate, t-butyl acrylate, isobutyl acrylate, ethyl methacrylate, butyl methacrylate, propyl methacrylate, isopropyl methacrylate, t-butyl methacrylate, cyclohexyl meth(acrylate) and isobutyl methacrylate. In one embodiment, the comononer is ethyl acrylate or butyl acrylate.

The surface-seeking particles may also optionally further comprise more than about 0.05 weight percent, such as 0.05-1.5 weight percent, of a crosslinker, preferably between 0.05-1.0 weight percent. Generally, such a crosslinker is selected from the group consisting of allyl methacrylate, allyl acrylate, triallylphosphate, diallyl maleate, methallyl acrylate, vinyl methacrylate, divinyl benzene, ethylene glycol dimethacrylate, diethylene glycol dimethacrylate, triethylene glycol dimethacrylate and mixtures thereof. In one embodiment, the crosslinker for use in the surface-seeking particle is ethylene glycol dimethacrylate (EGDMA).

The surface-seeking particles of the present invention are preferably larger in size than 0.8 microns, for example, greater than 1.0 microns, greater than 5.0 microns or greater than 10 microns. However, the surface seeking particle should be less than 5000 microns, for example, less than 4500 microns, less than 4000 microns, or less than 3500 microns in size. Preferably, the surface-seeking particles are between 150 and 590 microns in size, for example, between 150 and 250 microns.

Typically, the amount of the surface-seeking particles within the polymer matrix of the present invention is greater than at least 0.01 percent by weight, for example, at least 0.1 percent by weight, at least 0.5 percent by weight or at least 1.0 percent by weight, relative to the total weight of the composition, but less than 5.0 percent by weight, for example, less than 4.5 percent by weight, less than 3.0 percent by weight, or less than 2.5 percent by weight, relative to the total weight of the composition.

If color and increased opacity is desired in the final sheet product, various colorants or fillers may be added to the surface-seeking particles during their formation. Suitable colorants include pigments and dyes, such as carbon black, titanium dioxide, iron oxide tan, iron oxide red, chrome yellow, anthraquinone red, quinacridone red, phthalocyanine blue and mica Preferably, the colorants of the present invention comprise between 0.1 and 5.0 percent of the weight of the surface-seeking particle, preferably between 0.5 and 3.5 percent by weight.

The surface-seeking particles utilized in the present compositions may be prepared by any suitable process known to those skilled in the art. In one embodiment, material from which the surface-seeking particle is to be formed is ground and sieved to obtain particles having the desired sinking particle size range. Any suitable method for grinding and sieving can be utilized, as will be recognized by those skilled in the art.

Other auxiliary materials and adjuvants conventionally used in the art may be added to the present compositions (in the matrix) as needed for a particular application. Examples of such adjuvants or auxiliary materials are initiators, such as t-butyl neodecanoate and surfactants, such as sodium dilaurylsulfosuccinate.

In another embodiment of the present invention, the surface-seeking particles are transferred to the polymer matrix in a suspension comprising a high boiling hydrocarbon. Such high boiling hydrocarbons may include, for example, glycerol, dioctyl adipate, a dialkyl phthalate, such as dibutyl phthalatedisoheptyl phthalate, dihexyl phthalate, diisooctyl phathalate, diisononyl phathalate, diisodecyl phthalate, diisotridecyl phthalate, diisooctyl adipate, diisononyl adipate, diisodecyl adipate, ditridecl adipate and mixtures thereof. Preferably, the plasticizer is dibutyl phthalate. Preferably said high boiling hydrocarbon is inert relative to the matrix material.

The surface-seeking particles of the present invention are preferably stiffer than the cured matrix composition. Typically, the particles have a modulus of between 10% and 30% greater than the cured matrix, for example, 15 or 20% greater. The Young's modulus of the surface-seeking particles may be more than 50,000 psi greater than the matrix, for example, greater than 60,000 psi, for example, 70,000 psi. A suitable particle may have a Young's modulus greater than 400,000 psi, for example between 400,000 and 450,000 psi.

In one embodiment of the present invention, the particles undergo no swelling or only minimal swelling prior to curing the composition. Swelling is the phenomena by which a particle absorbs a substance, for example uncured curable material, to enlarge in size. In one embodiment, the particles do not swell beyond 100% of their original size, for example, they swell less than 70% or less than 50% of their original size (i.e., the size of the particles prior to contact with the curable material). In one embodiment of the present invention, at least 80% of the particles are unswollen, for example, at least 90% or at least 95%. As used herein, an unswollen particle (or substantially not swollen particle) is understood to mean a particle that has increased less than 10% in size relative to its original size.

The acrylic compositions of the present invention are prepared by mixing the particles with the curable material, such as polymethyl methacrylate, which will form the matrix of the composition and any additional materials as necessary for a particular application. In one embodiment, the curable material is a material that comprises an unsaturated monomer and or causes swelling of the particle. The materials can be mixed in any suitable manner, as will be evident to one skilled in the art. Preferably, the materials are mixed at room temperature with the surface seeking particles of the present invention added to the curable material, either directly or in a suspension of high boiling hydrocarbon just prior to use. Preferably, the particles or suspension of particles in high boiling hydrocarbon is added to the curable material within 5 minutes, for example within 2 minutes, as within 1 minute or immediately (less than 1 minute). The compositions are then cured by any suitable procedure, which will be evident to those skilled in the art, from the present disclosure. However, a preferred means for curing the material consists of allowing the mixture to stand at about 82° C. for about 20 minutes, and then at about 125° C. for about 7 minutes.

After curing, the acrylic compositions may then be used to prepare articles, such as spas and bathware, for example, bathtubs, shower stalls, sinks, whirlpools, spas and the like, by thermoforming. Suitable thermoforming processes are well known in the art and the present invention is not limited to any one type of thermoforming process.

Accordingly, the present invention also provides for a thermoformable sheet prepared by mixing particles with a curable composition and curing said curable composition, prior to the particles substantially swelling, to form a thermoformable sheet. In a further embodiment, a thermoformable sheet has a top surface that is substantially opposite a bottom surface, wherein said top surface does not contact the mold during thermoforming, and said top surface of the thermoformable sheet has a higher gloss than the gloss of said top surface after thermoforming. In another embodiment, the top surface of the thermoformable sheet is substantially smoother than said top surface after thermoforming.

In one embodiment, a thermoformable acrylic sheet is provided which has a top surface and an opposing bottom surface and comprises particles and an acrylic matrix, wherein greater than 50% of said particles are present in an area defined by said top surface and a parallel plane substantially equidistant from said top and bottom surfaces. Preferably, a thermoformable acrylic sheet is provided which has a top surface that is substantially opposite a bottom surface, wherein greater than 95% of the particles are present in an area defined by said top surface and a parallel plane positioned between said top surface and said bottom surface at a distance that is five times closer to said bottom surface than said top surface.

The acrylic compositions of the present invention have a lower gloss after they are thermoformed than they do prior to thermoforming. For example, the gloss of the acrylic composition prior to thermoforming may be greater than 75, such as 80-85. The gloss of the composition after thermoforming may be below 70, for example, 65 or below 60. Gloss may be measured by standard techniques (with a BYK Gardner 4512 gloss meter at 20°).

In one embodiment, an article produced by thermoforming, the thermoformable acrylic sheets described herein, has a texture which develops during the thermoforming process. Such texture is formed by protrusions in the surface of the thermoformed articles. In one embodiment, a thermoformed article has between 2-40 protrusions per square centimeter. The protrusions may have an average diameter of between 0.8 and 1.2 mm, and may protrude from the surface between 0.08 and 0.14 mm.

The following examples are given as particular embodiments of the invention and to demonstrate the practice and advantages thereof. It is understood that the examples are given by way of illustration and are not intended to limit the specification or the claims that may be derived there from in any manner.

EXAMPLES

General considerations and procedures: The following pigments were used in these examples, "Mica Pigment" was obtained from Merck (AF-110), "Cobalt Blue" pigment was number V-9250 obtained from the Ferro Corp., and the "Aluminum pigment" used in these example was AL885-20 available from the Silberline Corp. Acrylic sheets LS-8003, LS-8001 and White 131, are available from Lucite International, Inc.

Example 1

Preparation of Syrup (or Matrix): A Syrup was prepared by partial polymerization of the ingredients set forth in the following table:

| Component | Grams |
| --- | --- |
| Base Component (96% Methyl Methacrylate, 4% Butyl acrylate) | 554.82 |
| Esperox 33M (t-butyl peroxyneodecanoate) | 2.7 |
| Vazo 64 (2,2'-azobis-(isobutyronitrile)) | 0.24 |
| Ethylene glycol dimethacrylate | 1.38 |
| Lauryl Mercaptan | 1.2 |
| Tinuvin P (2-(2' hydroxy-5'-methyl phenyl) benzotriazole) | 0.06 |

These ingredients were mixed for 60 minutes at 20° C. and 40 mm Hg absolute pressure. Viscosity of the mixture was approximately 1000 cP.

Preparation of Particle Mixture: White 131 Lucite acrylic sheet was pulverized and sieved. The White 131 particulate fraction that passed through a #30 U.S. Mesh screen and was retained on a #60 U.S. Mesh screen was collected (herein "White 131 Particles"). A particle mixture was prepared from the ingredients set forth in the following table:

| Component | Grams |
| --- | --- |
| White 131 Particles | 11.5 |
| Colorant: Titanium Dioxide dispersed in dibutyl phthalate | 13.2 |
| High boiling hydrocarbon: Dibutyl Phathalate | 14.9 |

Casting and Molding: The syrup and particle mixture were mixed for 20 minutes. The mixture was poured into a casting cell made from two 10"×16" polished stainless steel plates spaced 0.157" apart with PVC gasket. The casting cell was sealed and placed horizontally in a constant temperature bath (83.5° C.) for 22 minutes to allow the particles to gravitate toward the surface. Curing was completed in another constant temperature bath (125° C.) for approximately 3 minutes. The casting was cooled to 80° C. in a constant temperature bath over an eight minute period. The casting cell was cooled to ambient temperature and disassembled. A 0.132" thick white glossy sheet was obtained.

The sheet was cut to 9-½"X9-½" size. The sheet was placed in a clamping frame of a thermoformer with the bottom surface from the casting facing upward and heated to 205° C. by radiant heaters positioned above and below the sheet. The sheet was removed from the heating chamber and vacuum formed in a 6-⅛" square by 4-½" deep female mold. The part was cooled and removed from the mold. The surface of the formed part had uniform texture and good aesthetics.

Example 2

A second sample was prepared the same as in Example 1 except in the particle mixture was formed from the ingredients set forth in the following table:

| Component | Grams |
| --- | --- |
| White 131 Particles | 11.5 |
| Colorant: Titanium Dioxide dispersed in dibutyl phthalate | 13.2 |
| Methyl Methacrylate | 14.9 |

A casting was prepared and thermoformed according to the procedure described in Example 1. The surface of the formed part had significantly less texture and the appearance was less pleasing than product described in Example 1.

Example 3

Preparation of Syrup (or Matrix): A Syrup was prepared by partial polymerization of the ingredients set forth in the following table:

| Component | Grams |
| --- | --- |
| Base Component (96% Methyl Methacrylate, 4% Butyl acrylate) | 563.22 |
| t-butyl peroxyneodecanoate | 2.7 |
| 2,2'-azobis-(isobutyronitrile) | 0.24 |
| Ethylene glycol dimethacrylate | 1.38 |
| Lauryl Mercaptan | 1.2 |
| 2-(2' hydroxy-5'-methyl phenyl) benzotriazole | 0.06 |

These ingredients were mixed for 60 minutes at 20° C. and 40 mm Hg absolute pressure. Viscosity of the mixture was approximately 1000 cP.

Preparation of Particle Mixture: LS-8001 Lucite acrylic sheet was pulverized and sieved. The LS-8001 particulate fraction that passed through a #60 U.S. Mesh screen and was retained on a #100 U.S. Mesh screen was collected (herein "LS-8001" particles). A particle mixture was prepared from the ingredients set forth in the following table:

| Component | Grams |
| --- | --- |
| "LS-8001" Particles | 7.8 |
| Mica pigment | 7.2 |
| Dibutyl phthalate | 16.2 |

A casting was prepared according to the procedure described in Example 1. A 0.133" thick glossy pearl sheet was obtained.

The sheet was cut to 9-½"X9-½" size. The sheet was placed in a clamping frame of a thermoformer with the bottom surface from the casting facing upward and heated to 205° C. by radiant heaters positioned above and below the sheet. The sheet was removed from the heating chamber and formed over a 5" square by 2-¼" thick mold. The part was cooled and removed from the mold. The surface gloss of the formed part was checked with a gloss meter (BYK Gardner 4512, micro-gloss 20°). The average surface gloss was 52.3.

Example 4

Another sample was prepared the same as in Example 3 except the particle mixture was formed from the ingredients set forth in the following table:

| Component | Grams |
| --- | --- |
| "LS-8001" Particles | 7.8 |
| Mica pigment | 7.2 |
| Methyl Methacrylate | 16.2 |

A casting was prepared and thermoformed according to the procedure described in Example 3. The average surface gloss was 67.4, which is higher than Example 3, indicating less surface texture than Example 3.

Example 5

Another sample was prepared the same as in Example 3 except LS-8001 particles were not included in the recipe. Details regarding syrup and pigment dispersion preparation are given below.

Preparation of Syrup (or Matrix): A Syrup was prepared by partial polymerization of the ingredients set forth in the following table:

| Component | Grams |
| --- | --- |
| Base Component (96% Methyl Methacrylate, 4% Butyl acrylate) | 571.02 |
| t-butyl peroxyneodecanoate | 2.7 |
| 2,2'-azobis-(isobutyronitrile) | 0.24 |
| Ethylene glycol dimethacrylate | 1.38 |
| Lauryl Mercaptan | 1.2 |
| 2-(2' hydroxy-5'-methyl phenyl) benzotriazole | 0.06 |

These ingredients were mixed for 60 minutes at 20° C. and 40 mm Hg absolute pressure. Viscosity of the mixture was approximately 1000 cP.

Preparation of Pigment Dispersion: Mica pigment dispersion was prepared by mixing ingredients set forth in the following table:

| Component | Grams |
| --- | --- |
| Mica pigment | 7.2 |
| Dibutyl phthalate | 16.2 |

The syrup and pigment dispersion were mixed for 20 minutes. A casting was prepared and thernoformed according to the procedure described in Example 3. The average surface gloss was 80.2 which is much higher than Example 3 indicating significantly less surface texture than Example 3.

Example 6

Preparation of Syrup (or Matrix): A Syrup was prepared by partial polymerization of the ingredients set forth in the following table:

| Component | Grams |
| --- | --- |
| Base Component (96% Methyl Methacrylate, 4% Butyl acrylate) | 565.62 |
| t-butyl peroxyneodecanoate | 2.7 |
| 2,2'-azobis-(isobutyronitrile) | 0.24 |
| Ethylene glycol dimethacrylate | 1.38 |
| Lauryl Mercaptan | 1.2 |
| 2-(2' hydroxy-5'-methyl phenyl) benzotriazole | 0.06 |

These ingredients were mixed for 60 minutes at 20° C. and 40 mm Hg absolute pressure. Viscosity of the mixture was approximately 1000 cP.

Preparation of Particle Mixture: LS-8003 Lucite acrylic sheet was pulverized and sieved. The LS-8003 particulate fraction that passed through a #60 U.S. Mesh screen and was retained on a #100 U.S. Mesh screen was collected (herein "LS-8003" particles). A particle mixture was prepared from the ingredients set forth in the following table:

| Component | Grams |
| --- | --- |
| "LS-8003" Particles | 7.8 |
| Cobalt Blue pigment dispersed in dibutyl phthalate | 11.1 |
| Aluminum pigment dispersed in dibutyl phthalate | 2.1 |
| Dibutyl phthalate | 7.8 |

A casting was prepared according to the procedure described in Example 1. A 0.140" thick blue glossy sheet was obtained. The sheet was cut to 9-½" X 9-½" size. The sheet was placed in a clamping frame of a thermoformer with the bottom surface from the casting facing upward and heated to 205° C. by radiant heaters positioned above and below the sheet. The sheet was removed from the heating chamber and vacuum formed in a 6-⅛" square by 4-½" deep female mold. The part was cooled and removed from the mold. The surface gloss of the formed part was checked with a gloss meter (BYK Gardner 4512, micro-gloss 20°. The average surface gloss was 24.4

Example 7

Another sample was prepared the same as in Example 6 except the particle mixture was formed from the ingredients set forth in the following table:

| Component | Grams |
| --- | --- |
| "LS-8003" Particles | 7.8 |
| Cobalt Blue pigment dispersed in dibutyl phthalate | 11.1 |
| Aluminum pigment dispersed in Methyl Methacrylate | 2.1 |
| Methyl Methacrylate | 7.8 |

A casting was prepared and thermoformed according to the procedure described in Example 6. The average surface gloss was 68.3 which is much higher than Example 6 indicating significantly less surface texture than Example 6.

Example 8

Another sample was prepared the same as Example 6 except LS-8003 particles were deleted from the recipe. Details regarding syrup and pigment dispersion preparation are given below.

Preparation of Syrup (or Matrix): A Syrup was prepared by partial polymerization of the ingredients set forth in the following table:

| Component | Grams |
| --- | --- |
| Base Component (96% Methyl Methacrylate, 4% Butyl acrylate) | 573.42 |
| t-butyl peroxyneodecanoate | 2.7 |
| 2,2'-azobis-(isobutyronitrile) | 0.24 |
| Ethylene glycol dimethacrylate | 1.38 |
| Lauryl Mercaptan | 1.2 |
| 2-(2' hydroxy-5'-methyl phenyl) benzotriazole | 0.06 |

These ingredients were mixed for 60 minutes at 20° C. and 40 mm Hg absolute pressure. Viscosity of the mixture was approximately 1000 cP.

Preparation of pigment dispersion: Cobalt blue and aluminum pigment dispersion was prepared by mixing ingredients set forth in the following table:

| Component | Grams |
| --- | --- |
| Cobalt Blue pigment dispersed in dibutyl phthalate | 11.1 |
| Aluminum pigment dispersed in dibutyl phthalate | 2.1 |
| Dibutyl phthalate | 7.8 |

The syrup and pigment dispersion were mixed for 20 minutes. A casting was prepared and thermoformed according to the procedure described in Example 6. The average surface gloss was 77.5 which is much higher than Example 6 indicating significantly less surface texture than Example 6.

What is claimed is:

1. A process, comprising a) dispersing particles in a carrier to form a particle mixture; b) mixing said particle mixture with a curable composition, whereupon contact with the particles causes said particles to swell; and c) curing said curable composition, prior to the particles substantially swelling, to form a thermoformable sheet, wherein said carrier is inert relative to said curable composition.

2. The process of claim 1 wherein said particles comprise a polyacrylate polymer.

3. The process of claim 1 wherein said curable composition comprises an unsaturated material whereupon contact with said particles causes the particles to swell.

4. The process of claim 1 wherein said thermoformable sheet comprises said particles that have a Young's modulus higher than the Young's modulus of said cured composition.

5. The process of claim 1 wherein said thermoformable sheet forms a textured surface upon thermoforming.

6. The process of claim 1 wherein said thermoformable sheet has a top surface that is substantially opposite a bottom surface, wherein said top surface does not contact a mold during thermoforming, and said top surface of the thermoformable sheet has a higher gloss than the gloss of said top surface after thermoforming.

7. The process of claim 1 wherein said thermoformable sheet has a top surface that is substantially opposite of bottom surface, wherein greater than 50% of the particles are present in an area defined by said top surface and a parallel plane equidistant from said top surface and said bottom surface.

8. The process of claim 1 wherein said thermoformable sheet has a top surface that is substantially opposite a bottom surface, wherein greater than 95% of the particles are present in an area defined by said top surface and a parallel plane positioned between said top surface and said bottom surface at a distance that is five times closer to said bottom surface than said top surface.

9. The process of claim 1 wherein at least 80% of said particles have a Young's modulus greater than 400,000 Psi.

10. The process of claim 1 wherein said particles have an average diameter of between 150 µm and 590 µm.

11. The process of claim 1 wherein the thermoformable sheet comprises between 0.1-5 wt % particles.

12. The process of claim 1 wherein said curing is initiated within 5 minutes of said mixing.

13. A thermoformable acrylic sheet having a top surface and an opposing bottom surface comprising: a) a particle mixture with particles dispersed in a carrier; and b) an acrylic matrix, wherein said carrier is inert relative to said matrix, whereupon contact of the particles with said matrix cause said particles to swell, and wherein greater than 50% of said particles are present in an area defined by said top surface and a parallel plan substantially equidistant from said top and bottom surfaces.

14. The sheet of claim 13 wherein greater than 95% of the particles are present in an area defined by said top surface and a parallel plane positioned between said top surface and said bottom surface at a distance that is five times closer to said bottom surface than said top surface.

15. The sheet of claim 13 wherein at least 80% of said particles are substantially un-swollen.

16. The sheet of claim 13 wherein said particles have an average diameter of between 150 µm and 590 µm.

17. An article formed from the sheet according to claim 13 wherein said top surface comprises between 2-40 protrusions per square centimeter.

18. The article of claim 17 wherein said top surface comprises protrusions that extend between 0.8 to 0.14 mm above the surface on average.

19. The article of claim 17 wherein said top surface comprises protrusions that have an average diameter of between 0.8 to 1.2 mm.

20. The process according to claim 1, wherein said carrier is a plasticizer.

21. The process according to claim 20, wherein said plasticizer is dibutyl phthalate.

22. The thermoformable acrylic sheet according to claim 13, wherein said carrier is a plasticizer.

23. The thermoformable acrylic sheet according to claim 22, wherein said plasticizer is dibutyl phthalate.

* * * * *